UNITED STATES PATENT OFFICE.

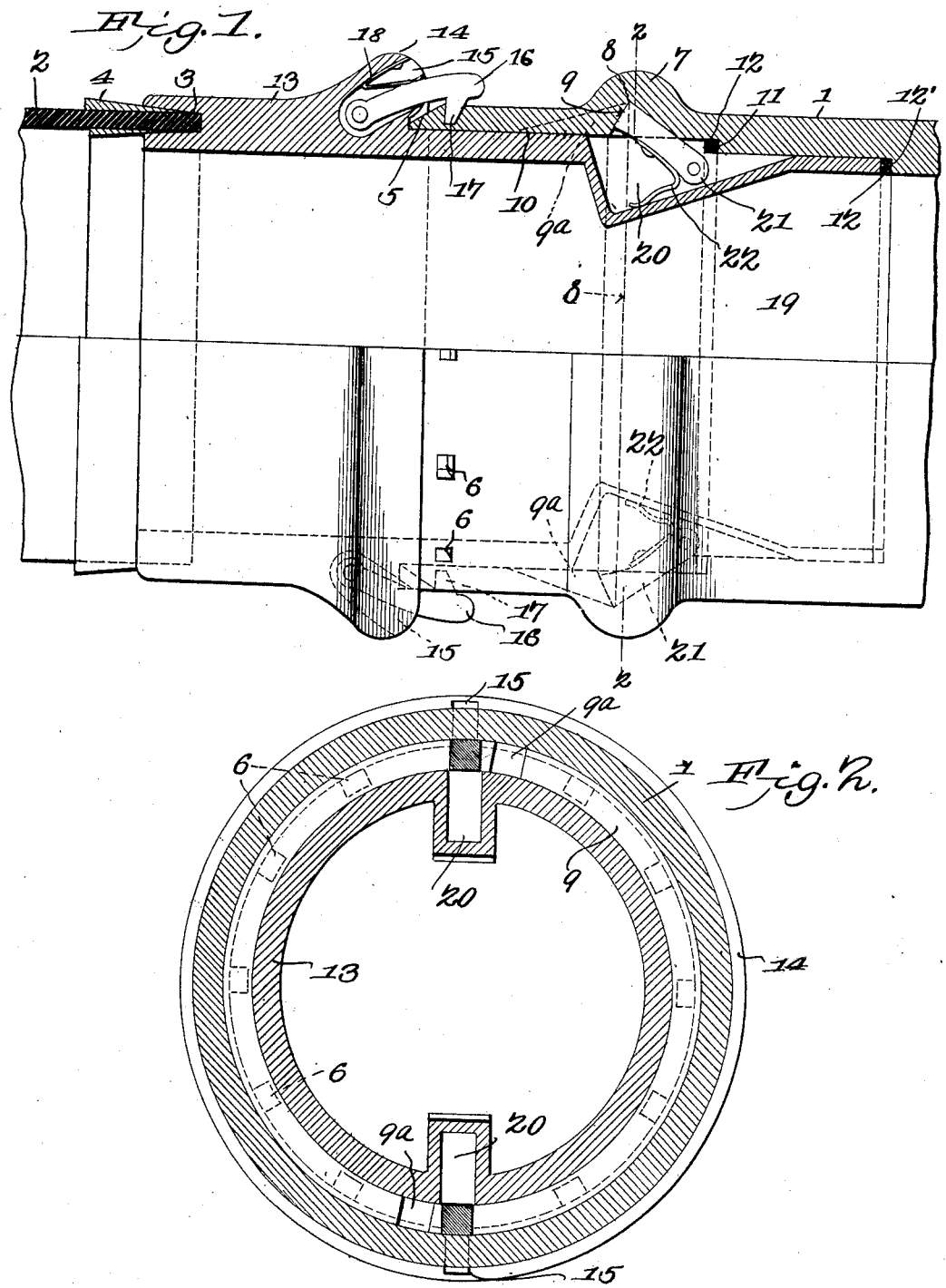

ARTHUR FRANCIS STIRZAKER, OF LORAIN, OHIO.

HOSE-COUPLING.

No. 832,757.     Specification of Letters Patent.     Patented Oct. 9, 1906.

Application filed February 28, 1906. Serial No. 303,499.

*To all whom it may concern:*

Be it known that I, ARTHUR FRANCIS STIRZAKER, a citizen of the United States, residing at Lorain, in the county of Lorain and State of Ohio, have invented a new and useful Hose-Coupling, of which the following is a specification.

This invention relates to hose-couplings; and its object is to provide a coupling which can be quickly secured by pressing together the two parts thereof.

A still further object is to provide novel locking means for fastening the parts of the coupling and holding them against accidental displacement, said means, however, being easily accessible for the purpose of detaching the two members of the coupling.

With the above and other objects in view the invention consists of a head on which are disposed catches which are so located as to engage both the inner and outer faces of the other head of the coupling.

The invention also consists of certain other novel features of construction and combinations of parts, which will be hereinafter more fully described, and pointed out in the claims.

In the accompanying drawings is shown the preferred form of the invention.

In said drawings, Figure 1 is a view, partly in side elevation and partly in section, through the two members of the coupling in engagement; and Fig. 2 is a section on line 2 2, Fig. 1.

Referring to the figures by numerals of reference, 1 is the tubular receiving-head, and 13 is the outer or locking head of the coupling. Both are adapted to be secured to a hose 2 in any preferred manner. The hose is preferably fastened to the head by inserting the end thereof into a circular recess 3, formed in the end of the head, and then fastening it by means of wedges 4, which are adapted to be driven into the recess. The receiving-head 1 has one end beveled, as shown at 5, and arranged within the outer face of the head adjacent the bevel is an annular series of notches 6. An annular bead or enlargement 7 is formed around the head 1 at a point between the ends thereof, and an interior groove 8 is formed within the inner surface of the head and is surrounded by this enlargement 7, so that the head will not be weakened at this point. One of the walls of the groove forms a shoulder 9, which is for the purpose hereinafter more fully set forth. The shoulder 9 has grooves 9ª extending therethrough at predetermined intervals apart, the inner walls of these grooves being inclined toward the bottom of the groove 8. The passage through the head 1 is enlarged for a portion of its length, as shown at 10, said enlargement forming shoulders 11 and 12'. Packing-rings 12 are disposed in the head and upon the shoulders 11 and 12'.

The outer or locking head 13 of the coupling has an annular enlargement 14 thereon between its ends and within which are formed recesses 15. In each recess is pivoted an arm 16, having a lug 17 extending inwardly therefrom. A spring 18 is interposed between arm 16 and one wall of its recess for the purpose of holding the lug normally projecting inward toward the longitudinal center of the head. The lug is tapered so that should any object be brought into contact therewith the same will be pressed laterally thereby. That portion 19 of the head 13 which extends beyond the enlargement 14 is stepped so as to conform with the interior of that portion of head 1 between its beveled end and the shoulders 11 and 12. Inwardly-extending hollow ears 20 are formed with the reduced portion 19 of head 13, and within each of these ears is pivoted an arm 21, which is held normally projected beyond the outer surface of head 13 by means of a spring 22. These arms 21 are so disposed that when the head 13 is inserted into the head 1 the arms 21 will swing outward against the shoulder 9 in groove 8.

It is thought that in view of the foregoing description the manner of coupling the two members will be apparent. The reduced end 19 of the head 13 is inserted into the head until the said end contacts with and compresses the washer 12. During this operation the spring-pressed arm 21 will be forced into the ears 20 until the groove 8 arrives in position over said arms, whereupon they will swing outward into engagement with shoulder 9. Meanwhile the lugs 17 and the arms 16 have been spread laterally by the beveled end 5 of head 1, and simultaneously with the seating of arms 21 in groove 8 the lugs 17 spring into those recesses 6 registering therewith. The member 1 is thus engaged upon its inner and its outer faces by catches connected to the other member, and therefore it becomes impossible to unintentionally separate the two heads. When it is desired to detach the heads from each other, the arms 16 and their lugs 17 are swung laterally, so as to become disengaged from the head 1, and said head is turned until the arms 21 therein register with the grooves 9ª. The head 1 can then be slid off of the reduced portion 19 of the head 13, and the inclined walls of the grooves 9ª will gradually depress the arms 21, so that there will be nothing to hinder the separation of the two heads. It will be understood that the locking-arms 21 are so spaced apart as to simultaneously register with the grooves 9ª, and the notches 6 are disposed so that the arms 21 will not register with the grooves 9ª while lugs 17 are seated in any of the recesses 6.

A coupling such as herein described is particularly adapted for use with fire-hose, because the two heads can be quickly brought together and locked without the use of any tools and also because there is no danger of the heads becoming accidentally detached.

What is claimed is—

1. A hose-coupling comprising a head, a spring-pressed locking device normally projecting therefrom and adapted to be seated therein, a receiving-head slidably and rotatably mounted on the first-mentioned head and having an interior annular groove adapted to receive the locking device, outlet-grooves communicating with the annular groove and adapted to move into register with the locking device, and means for securing the heads against independent rotation.

2. In a hose-coupling the combination with a head having spring-pressed devices pivoted upon the head, and spring-pressed locking-arms pivoted within and normally projecting over said head; of a receiving-head adapted to slide and rotate upon the first-mentioned head said receiving-head having an interior annular groove, longitudinally-disposed outlet-grooves communicating therewith and recesses in the outer face of the head, said recesses adapted to receive the locking-lugs and the interior groove adapted to receive the locking-arms.

3. In a hose-coupling a member having an annular enlargement and a recessed reduced portion, a spring-pressed locking device pivoted within and projecting from the enlargement and a spring-pressed locking-arm pivoted within and normally projecting from the recess.

4. In a hose-coupling, a member having an annular enlargement and a recessed reduced portion, spring-pressed locking-arms pivoted within the enlargement, locking-lugs extending inwardly therefrom, and spring-pressed locking-arms pivoted within and normally projecting from the recesses.

In testimony that I claim the foregoing as my own I have hereto affixed my signature in the presence of two witnesses.

ARTHUR FRANCIS STIRZAKER.

Witnesses:
O. G. MANNING,
S. J. STIRZAKER.